Patented Aug. 22, 1950

2,519,389

UNITED STATES PATENT OFFICE 2,519,389

SEED FOR PRODUCTION OF TITANIUM DIOXIDE AND PROCESS OF MAKING SAME

Max J. Mayer, Scarsdale, N. Y.

No Drawing. Application July 12, 1948,
Serial No. 38,193

9 Claims. (Cl. 23—202)

The present invention relates to the production of titanium dioxide and has particular reference to a seed for the preparation of titanium dioxide.

Many methods have been proposed for the preparation of nuclear dispersions of materials to induce rutilization when used in the hydrolysis of titanium sulfate and other solutions and the hydrolysate calcined. The dispersing media for these seed dispersions are monobasic acids, for example HCl. Titanium dioxide is generally proposed as the seeding agent, but tin dioxide and other oxides of the metals of the fourth group have been suggested. Among the patents which describe such nuclear dispersions may be mentioned United States Patents Nos. 2,062,133; 2,285,485; 2,285,486; 2,301,412; 2,303,305; 2,303,306 and 2,305,307 and British Patents Nos. 405,669 and 533,227.

This art teaches that the presence of sulfate ions in these nuclear dispersions is harmful. For example, United States Patent No. 2,303,306 and British Patent No. 533,227 state that sulfate ions should be removed, and United States Patent No. 2,285,486 states that salts of polyvalent acids should be avoided.

I have surprisingly discovered that sulfate ions under certain conditions have a very beneficial action on the seed dispersion.

In most of the prior art practice, concentration of $TiO_2$ in the seed dispersion is relatively low; that is, 20 g./l. $TiO_2$ or less. Also, most of the prior art is founded upon and recommends the use of relatively large quantities of seed for hydrolysis; that is, from 8 to 20% of the $TiO_2$ content of the hydrolysis solution. Such seed dispersions in the quantities recommended consequently require rather large volumes of the seed dispersions for hydrolysis, thus rendering the operation cumbersome and costly.

I have found that limited quantities of sulfate ions have a stabilizing effect on these seed dispersions. Due to this action, I have been able to prepare highly effective seed dispersions of much higher concentration than heretofore, as well as highly effective seed dispersions of lower concentrations of $TiO_2$.

Among the objects of this invention is the preparation of improved nuclear dispersions of seed for hydrolysis of titanium salt solutions, utilizing the beneficial effects of stabilizers according to my discovery.

A further object of my invention is the preparation of nuclear seed dispersions in concentrated as well as dilute state that will serve effectively and efficiently for hydrolysis of titanium salt solutions whether such seed dispersions are employed therefor immediately or substantially long periods after preparation.

Another object of this invention is to prepare stabilized nuclear dispersions of seed from salts of titanium or other metals of the fourth group and a monobasic acid.

More specifically, it is an object of this invention to prepare the aforesaid stabilized nuclear dispersions of seed by means of stabilizers containing polyvalent anions and which are volatile under calcining conditions; that is, those stabilizers which disappear during calcination as such as well as those which decompose into volatile products during calcination.

Other, further and more specific objects of this invention will become readily apparent to persons skilled in the art from a consideration of the following description, including specific examples.

When dispersions containing 20 g./l. $TiO_2$, or more, are formed without stabilizing agents, precipitates form on standing and at the higher concentrations the seed dispersions must be employed almost immediately after preparation in order to utilize their initial efficiency. By using stabilizing agents with dispersions of these concentrations of $TiO_2$, the need for immediate use of the dispersions after their preparation is overcome.

At $TiO_2$ concentrations below 20 g./l. sulfate ions have been found to cause an initial flocculation which disappears after a short time, resulting in a stable seed dispersion.

The amount of sulfuric acid should generally not exceed 6.5% by weight of the $TiO_2$ content or 55 millimols of $H_2SO_4$ per mol of $TiO_2$, in order to form a stable dispersion and the minimum amount is slightly under 0.5%, or 4 millimols of $H_2SO_4$ per mol of $TiO_2$.

In lieu of sulfates, molar equivalents of other polyvalent anions may be employed in the nucleating agent, these polyvalent anions being decomposed when calcined; for example arsenic, boric, oxalic, tartaric, succinic, maleic and amino acids and their salts and those of the aromatic series.

The following examples are illustrative:

Example I

Portions of titanium chloride solution, 237 g./l. $TiO_2$ and 381 g./l. HCl and made from titanium tetrachloride were treated as follows:

(a) 42.2 c. c. of the titanium chloride solution and 11.4 c. c. of a solution containing 17.5 g./l. $H_2SO_4$ were added to water, so that the final volume was one liter. The concentration was then 10 g./l. $TiO_2$, with $H_2SO_4$ equal to 2% of $TiO_2$ content and serving as a stabilizer. The solution was heated to a temperature of from 70° C. to the boiling point thereof, preferably for 10 minutes at 90° C. to develop the nuclear properties and then rapidly cooled to below 60° C., after which the resulting dispersion was clear and opalescent.

(b) 84.4 c. c. of the titanium chloride solution and 22.8 c. c. of a solution containing 17.5 g./l. $H_2SO_4$ were added to water so that the final volume was one liter. The concentration was then 20 g./l. $TiO_2$, with $H_2SO_4$ equal to 2% of the $TiO_2$ content. The solution was heated 10 minutes at 90° C. to develop the nuclear properties and then rapidly cooled to below 60° C., after which the resulting dispersion was clear and opalescent.

*Example II*

Pure titanium sulfate liquor was used. It was made from titanyl sulfate having

| | |
|---|---|
| $TiO_2$ ----g./l-- | 209 |
| $H_2SO_4$ ----g./l-- | 397 |
| Acid factor ---- | 1.55 |

The acid factor is the mol ratio of free plus combined acid to $TiO_2$.

To 814 c. c. of the above solution, under rapid agitation, was added a water slurry of 190 g. calcium carbonate. The precipitated calcium sulfate was removed by filtration. A saturated solution of barium chloride was then added, in amount just sufficient to precipitate from solution the remaining sulfate ions. The precipitated barium sulfate was removed by filtration, and two different parts of the filtrate were treated as follows:

(a) The first part containing 60 gr. $TiO_2$ was treated with citric acid equivalent to an amount of $H_2SO_4$ equal to 2% of the $TiO_2$ content, diluted to 1 liter and heated 10 minutes at 90° C. to develop the nuclear properties and then rapidly cooled to below 60° C., after which the resulting dispersion appeared stable and opalescent.

(b) The second part containing 90 gr. $TiO_2$ was treated with citric acid equivalent to an amount of $H_2SO_4$ equal to 4% of the $TiO_2$ content, diluted to one liter and heated 10 minutes at 90° C. to develop the nuclear properties and then rapidly cooled to below 60° C., after which the resulting dispersion appeared stable and opalescent.

*Example III*

A pure titanium chloride solution was prepared from $TiCl_4$, and containing 160 g./l. $TiO_2$ and 180 g./l. HCl. The solution was divided into several portions which were treated with $H_2SO_4$ in amounts of 0.0, 0.5, 0.75, 1.0, 1.5, 2.0, 2.5, 3.0, 4.0, 5.0 and 6.0% by weight of the $TiO_2$ content. The solutions were diluted to concentrations containing 20-60 g./l. $TiO_2$ and were cured; i. e. heated to 90° C. and kept at this temperature for 10 minutes. The solutions were then cooled quickly to below 50° C.

The amount of stabilizer should generally not exceed 6.5% by weight of the $TiO_2$ content, or 55 millimols of stabilizer per mol of $TiO_2$, in order to form a stable seed and the minimum amount of stabilizer is slightly under 0.5%, or 4 millimols of stabilizer per mol of $TiO_2$. For most practical purposes the quantity of stabilizer is preferred in the range of 2.5-3.6% $H_2SO_4$ or 20-30 millimols of $H_2SO_4$ per mol of $TiO_2$. When the HCl concentration in the dispersion to be stabilized is low; e. g. 20 g./l., it is preferable to use 0.5-3.6% $H_2SO_4$ or 4-30 millimols $H_2SO_4$ per mol of $TiO_2$. On the contrary, where the HCl concentration in the dispersion to be stabilized is high, for example 40 g./l., it is preferable to employ 2.5-6.0% $H_2SO_4$ or 20-50 millimols of $H_2SO_4$ per mol of $TiO_2$. When other stabilizers having polyvalent anions are used in lieu of $H_2SO_4$, the corresponding molar equivalents are employed.

The term "stabilize" and its derivatives are used to denote the prevention of secondary agglomeration of the cured seed after the primary growth thereof has been arrested by cooling, with consequent impartation to the dispersed titanium hydrate seed of the property of maintaining practically its entire activity, potency and efficiency as a seed for prolonged period of time after stabilization, as distinguished from the relatively short period of effectiveness of the dispersed titanium hydrate seed before stabilization. It is the specific phenomenon of preventing the sub-microscopic crystal seeds from growing together into microscopic and macroscopic crystal seeds.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a continuation-in-part of my applications Serial Nos. 516,212 and 516,213, filed December 30, 1943, now Patent No. 2,480,869 and Patent No. 2,444,940, respectively, and Serial No. 2,560, filed January 15, 1948, now Patent No. 2,444,939.

I claim as my invention:

1. In a method of producing a rutile inducing seed for use in hydrolysis of hydrolyzable titanium salt dispersions, heating at temperature from 70° C. to boiling a solution of a chloride of titanium containing a stabilizer having polyvalent anions and which on calcination volatilizes before the temperature reaches 950° C., said stabilizer in amount of 4-55 millimols per mol of $TiO_2$ being present in the solution during the heating of the solution, said heating being carried out until curing is effected, and then rapidly cooling below 60° C.

2. The process claimed in claim 1, wherein the stabilizer comprises sulfuric acid.

3. The process claimed in claim 1, wherein the stabilizer comprises citric acid.

4. In a method of producing a rutile inducing seed for use in hydrolysis of hydrolyzable titanium salt dispersions, heating at temperature from 70° C. to boiling a solution of a chloride of titanium containing a stabilizer having polyvalent anions and which on calcination volatilizes before the temperature reaches 950° C., said stabilizer in amount of 20-30 millimols per mol of $TiO_2$ being present in the solution during the heating of the solution, said heating being carried out until curing is effected, and then rapidly cooling below 60° C.

5. In a method of producing a rutile inducing seed for use in hydrolysis of hydrolyzable titanium salt dispersions, heating at temperature from 70° C. to boiling a solution of a chloride of titanium containing a stabilizer having polyvalent anions and which on calcination volatilizes before the temperature reaches 950° C., said stabilizer in amount 4-30 millimols per mol of $TiO_2$ being present in the solution during the heating of the solution, said heating being carried out until curing is effected, and then rapidly cooling below 60° C.

6. In a method of producing a rutile inducing seed for use in hydrolysis of hydrolyzable titanium salt dispersions, heating at temperature from 70° C. to boiling a solution of a chloride of titanium containing a stabilizer having polyvalent anions and which on calcination volatilizes before the temperature reaches 950° C., said stabilizer in amount of 20–55 millimols per mol of $TiO_2$ being present in the solution during the heating of the solution, said heating being carried out until curing is effected, and then rapidly cooling below 60° C.

7. A stabilized heat-cured rutile inducing seed comprising nuclei of a titanium dioxide dispersed in a monobasic acid and stabilized with 4–55 millimols of citric acid per mol of the $TiO_2$ content, the molar ratio of monobasic acid to $TiO_2$ being from about 1 to 2.2.

8. The seed claimed in claim 7, wherein the $TiO_2$ content is 20 to 90 grams per liter.

9. The seed claimed in claim 7, wherein the monobasic acid is HCl.

MAX J. MAYER.

REFERENCES CITED

The following references are of record in the file of this patent:

FOREIGN PATENTS

| Number | Country | Date |
| --- | --- | --- |
| 553,227 | Great Britain | Feb. 10, 1941 |